United States Patent

Ricco

[11] Patent Number: 5,979,411
[45] Date of Patent: Nov. 9, 1999

[54] FAST-FIT CONNECTING DEVICE FOR CONNECTING A BACKFLOW CONNECTOR TO AN INTERNAL COMBUSTION ENGINE FUEL INJECTOR

[75] Inventor: Mario Ricco, Bari, Italy

[73] Assignee: Elasis Sistema Ricerca Fiat Nel Mezzogiorno Societa Consortile Per Azioni, Pomigliano D'Arco, Italy

[21] Appl. No.: 09/096,801

[22] Filed: Jun. 12, 1998

[30] Foreign Application Priority Data

Jun. 16, 1997 [IT] Italy .................................. TO97A0518

[51] Int. Cl.$^6$ ...................................................... F02M 55/02
[52] U.S. Cl. .............................................. 123/469; 123/514
[58] Field of Search ............................... 123/468–9, 470, 123/456, 514

[56] References Cited

U.S. PATENT DOCUMENTS

| | | | |
|---|---|---|---|
| 4,307,693 | 12/1981 | Glockler et al. | 123/470 |
| 5,058,554 | 10/1991 | Takeda et al. | 123/468 |
| 5,070,844 | 12/1991 | Daly | 123/468 |
| 5,092,300 | 3/1992 | Imoehl | 123/469 |
| 5,146,896 | 9/1992 | Imoehl | 123/470 |

FOREIGN PATENT DOCUMENTS

| | | |
|---|---|---|
| 0753658 | 1/1997 | European Pat. Off. . |
| 19603506 | 6/1997 | Germany . |
| 1415585 | 11/1975 | United Kingdom . |

*Primary Examiner*—Thomas N. Moulis
*Attorney, Agent, or Firm*—Ladas & Parry

[57] ABSTRACT

The injector has a recirculating conduit with an end element having two recesses, each incorporating an opening; the backflow connector has a connecting element having a groove, and is fitted to the end element so that the groove corresponds with the openings; a C-shaped snap-on fastener has two arms with two portions for simultaneously engaging or releasing the recesses and, via the openings, also the groove; and the backflow connector is connected and disconnected by translating the fastener, which, however, remains secured to the injector at all times.

11 Claims, 1 Drawing Sheet

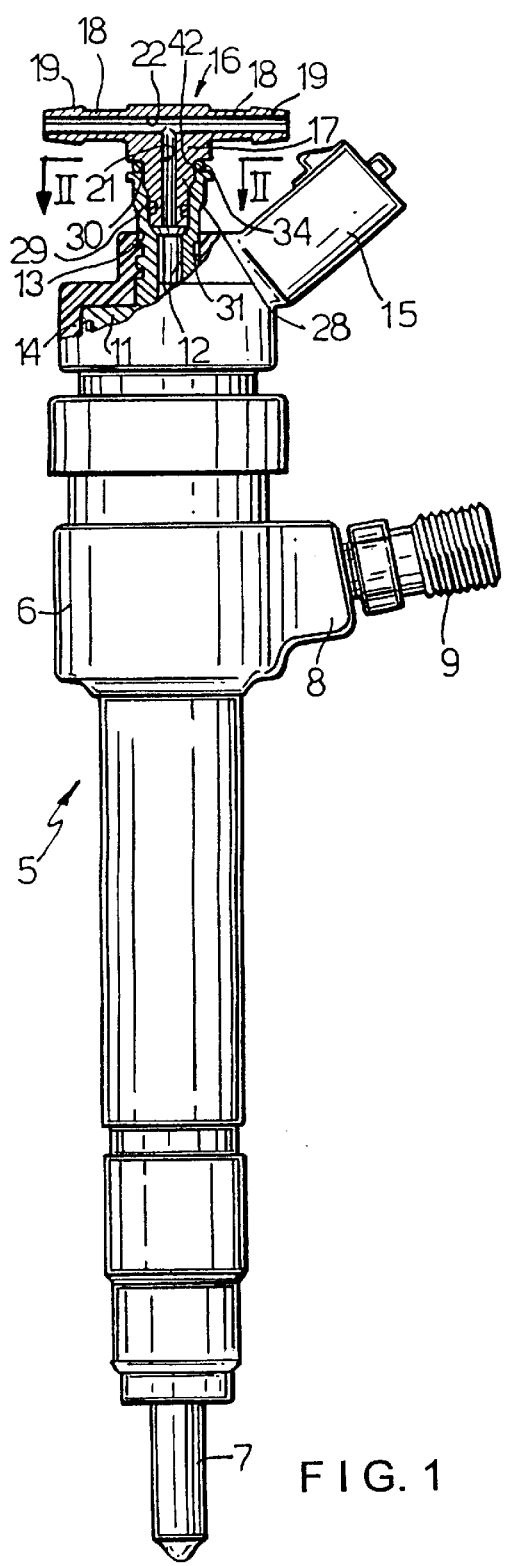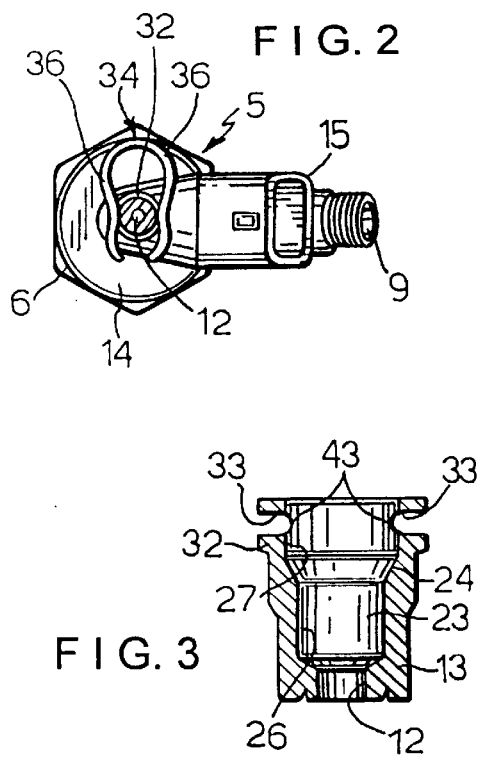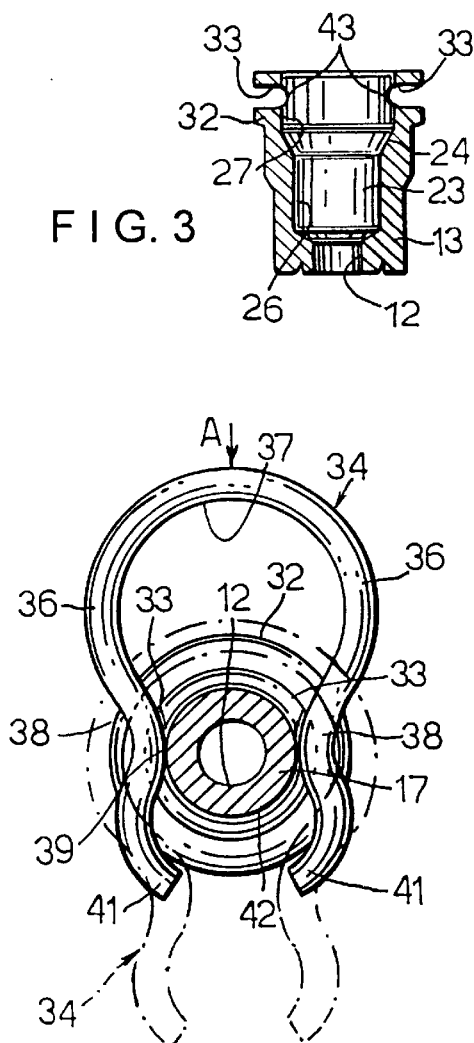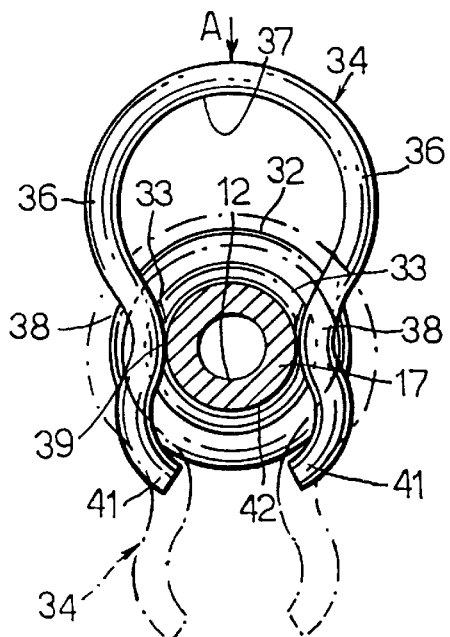

FAST-FIT CONNECTING DEVICE FOR CONNECTING A BACKFLOW CONNECTOR TO AN INTERNAL COMBUSTION ENGINE FUEL INJECTOR

BACKGROUND OF THE INVENTION

The present invention relates to a fast-fit connecting device for connecting a backflow connector to an internal combustion engine fuel injector.

Fuel injectors normally feature a recirculating conduit integral with the injector body and comprising a normally cylindrical end element. The fuel flowing through the metering valve and any fuel leaking between the various surfaces, e.g. the surfaces of the pin and nozzle, is fed back into the tank along a backflow conduit comprising a backflow connector, which is connected removably to the end element of the recirculating conduit.

Various connecting devices of the above type are known. In one known device, the backflow connector is in the form of a cap, which is fitted onto the end element of the recirculating conduit; the end element comprises an annular groove; the connector comprises an eccentric transverse hole which is positioned tangent to the annular groove; and the connector is locked to the end element by inserting inside the hole a pin which engages the annular groove.

A major drawback of the above type of connecting device is the fairly long time taken to connect and disconnect the connector, due to the pin having to be forced inside the hole, and the ends of the pin having to be bent to prevent the pin from withdrawing accidentally from the hole. Moreover, in the course of servicing or repair work, the pin, when removed from the hole, is detached from the connected parts, and must therefore be put aside until it is needed to re-lock the connector to the injector. This often results in a good deal of time being wasted in the event the pin is mislaid.

SUMMARY OF THE INVENTION

It is an object of the present invention to provide a highly straightforward, reliable fast-fit connecting device designed to overcome the aforementioned drawbacks typically associated with known devices.

According to the present invention, there is provided a fast-fit connecting device for connecting a backflow connector to a fuel injector of an internal combustion engine, wherein the injector comprises a recirculating conduit integral with the body of the injector, said recirculating conduit having an end element comprising a first groove; and wherein said backflow connector comprises a connecting element fittable to said end element; characterized by comprising a snap-on fastener for simultaneously engaging said first groove and a second groove located on said connecting element.

BRIEF DESCRIPTION OF THE DRAWINGS

A preferred, non-limiting embodiment of the present invention will be described by way of example with reference to the accompanying drawings, in which:

FIG. 3 shows a partially sectioned view of an internal combustion engine fuel injector featuring a connecting device in accordance with the present invention;

FIG. 2 shows a section along line II—II in FIG. 1;

FIG. 3 shows a larger-scale view of a detail in FIG. 1;

FIG. 4 shows a larger-scale view of a detail in FIG. 2.

DETAILED DESCRIPTION OF THE INVENTION

Number 5 in FIG. 1 indicates a fuel injector of an internal combustion engine, e.g. a diesel engine; injector 5 comprises a body 6 connected to a nozzle 7 controlled by a normal electromagnetic metering valve; and body 6 comprises an appendix 8 in which is inserted an inlet fitting 9 connected to a normal fuel supply pump.

Injector 5 comprises a cover 11 integral with body 6 and in turn comprising a recirculating conduit 12 for recirculating the fuel from the metering valve and any fuel leaking between the mating surfaces of the various members of injector 5; recirculating conduit 12 comprises a substantially cylindrical end element 13; and cover 11 is covered with a plastic molding 14 comprising an appendix 15 for supporting the electric conductors of the electromagnet of the metering valve.

End element 13 is connected to a backflow connector indicated as a whole by 16. More specifically, connector 16 comprises a connecting element 17 inserted inside end element 13, and two arms 18 having respective ogival portions 19; connecting element 17 comprises a channel 21 communicating with a channel 22 inside the two arms 18; and the two ogival portions 19 are fitted with the conduits (not shown) of the usual backflow circuit for feeding the fuel recycled by conduit 12 back into the tank.

According to the invention, end element 13 comprises a cavity 23 (FIG. 3) for receiving connecting element 17. More specifically, cavity 23 is defined by the inner surface of element 13, and comprises a truncated-cone-shaped portion 24 between two cylindrical portions 26 and 27; and the outer surface of connecting element 17 (FIG. 1) is complementary in shape to the surface of cavity 23, and comprises a truncated-cone-shaped portion 28 between two cylindrical portions 29 and 30. A seal 31 is provided between cylindrical portion 26 of cavity 23 and cylindrical portion 29 of connecting element 17 to seal the connection between conduit 12 and channel 21.

End element 13 also comprises a flange 32 (FIGS. 3 and 4) in turn comprising a groove defined by two diametrically opposed cavities 33, which are engaged by a snap-on fastener indicated as a whole by 34. More specifically, fastener 34 comprises a section of elastic material, e.g. music wire, is flat and substantially C-shaped, and comprises two symmetrical arms 36 (FIG. 2) shaped to define an arc 37 of over 180° and with an inside diameter slightly smaller than that of flange 32.

Arms 36 comprise respective portions 38 (FIG. 4) so shaped as to define a constriction or throat 39 of fastener 34; each portion 38 has a curved, preferably arc-shaped profile; and arms 36 terminate with respective inner bent ends 41. The section of fastener 34 (FIG. 1) may have a square or rectangular cross section, but is preferably circular, in which case, the end walls of cavities 33 (FIG. 3) have an arc-shaped cross section.

In the plane perpendicular to the axis of conduit 12, cavities 33 (FIG. 4) are curved to correspond with the shape of portions 38; cylindrical portion 30 of connecting element 17 comprises an annular groove 42, which, in use, lies in the same plane as cavities 33 (FIG. 1); each cavity 33 is of such a depth and is so curved as to define, at a central portion of cavity 33, an opening 43 in cylindrical portion 27 of cavity 23; which openings 43 permit portions 38 of arms 36 to also engage annular groove 42 of connecting element 17.

The fast-fit connecting device described operates as follows.

When connector 16 (FIGS. 1 and 3) is first connected to injector 5, fastener 34 is first fitted onto end element 13 by widening arc 37 slightly to get past flange 32, so that the fastener is secured to injector 5 in the position shown by the dot-and-dash line in FIG. 4; and connecting element 17 (FIGS. 1 and 3) is then inserted inside cavity 23, so that truncated-cone-shaped portion 28 of element 17 engages truncated-cone--shaped portion 24 of cavity 23, and annular groove 42 of element 17 is located at cavities 33.

At this point, orienting fastener 34 with arms 36 (FIG. 4) substantially parallel to cavities 33, fastener 34 is pulled to translate it in the opposite direction to that indicated by arrow A in FIG. 4, so that the two curved portions 38 of arms 36 engaging the outer surface of flange 32 are parted and eventually snap inside cavities 33 and, via openings 43, also engage annular groove 42 of element 17 to lock connector 16 to injector 5.

Connector 16 is disconnected from injector 5 by simply pressing fastener 34 in the direction of arrow A to translate it downwards in FIG. 4, so that the end walls of cavities 33, acting on portions 38 of fastener 34, part arms 36 to snap portions 38 out of cavities 33. Fastener 34 is now positioned with arc 37 at end element 13, but is still secured to injector 5 by flange 32, and therefore readily available to the fitter when required for connecting connector 16.

As compared with known connecting devices, the advantages of the fast-fit connecting device according to the present invention will be clear from the foregoing description. In particular, it involves simply sliding fastener 34, which takes very little time; it provides for retaining fastener 34 to injector 5 once backflow connector 16 is disconnected, thus preventing the fastener from being mislaid; and, finally, it is cheap to produce.

Clearly, changes may be made to the device as described and illustrated herein without, however, departing from the scope of the accompanying Claims. For example, changes may be made to the shape of fastener 34 and cavities 33, providing connection is achieved as described above; cavities 33 may be defined by a single groove extending about the whole periphery of flange 32 and comprising two curved cavities at the two openings 43; and, finally, arc 37 of fastener 34 may be oval as opposed to circular.

I claim:

1. A fast-fit connecting device for connecting a backflow connector (16) to a fuel injector (5) of an internal combustion engine, wherein the injector (5) comprises a recirculating conduit (12) integral with the body (6) of the injector (5), said recirculating conduit (12) having an end element (13) comprising a first groove (33); and wherein said backflow connector (16) comprises a connecting element (17) fittable to said end element (13); characterized by comprising a snap-on fastener (34) for simultaneously engaging said first groove (33) and a second groove (42) located on said connecting element (17).

2. A device as claimed in claim 1, characterized in that said fastener comprises a section (34) made of elastic material and which is substantially C-shaped; said grooves (33, 42) being coaxial, and being positioned in a common plane for engagement by said section (34).

3. A device as claimed in claim 2, characterized in that said grooves (33, 42) are formed on respective outer surfaces of said elements (13, 17); the groove (33) of one of said elements (13, 17) comprising at least one opening (43) to permit said section to engage the groove (42) of the other of said elements (13, 17).

4. A device as claimed in claim 3, characterized in that said end element (13) comprises a cavity (23) for receiving said connecting element (17); said first groove (33) comprising two diametrically opposed openings (43).

5. A device as claimed in claim 4, characterized in that said section (34) has a circular cross section, and comprises two symmetrical arms (36) shaped to substantially form an arc of over 180°; each of said arms (36) comprising a portion (38) for engaging one of said openings (43); and said portions (38) of said arms (36) being so shaped as to form a constriction (39).

6. A device as claimed in claim 5, characterized in that said portions (38) have a curved profile; said first groove being defined by two coplanar, diametrically opposed recesses; each of said recesses (33) incorporating one of said openings (43); and said recesses having, in the relative common plane, a curved profile such as to house said portions (38).

7. A device as claimed in claim 6, characterized in that said second groove (42) is annular.

8. A device as claimed in claim 6, characterized in that said end element (13) comprises a flange (32) in which said recesses (33) are formed; said arc (37) being slightly smaller in diameter than said flange (32) to retain said fastener (34) to the injector (5) when said backflow connector (16) is disconnected.

9. A device as claimed in claim 8, characterized in that said fastener (34) engages said recesses (33) by translation in said common plane; said flange (32) parting said arms (36) in the course of said translation; and said recesses (33) snapping the fastener (34) during said engaging step.

10. A device as claimed in claim 8, characterized in that said fastener (34) is released from said recesses (33) by applying radial pressure, parallel to said arms (36), on said arc (37); said recesses (33) again parting said arms (36) to release said portions from said second groove (42).

11. A device as claimed in claim 3, characterized in that the inner surface of said end element (13) comprises a truncated-cone-shaped portion (24) between two cylindrical portions (26, 27); the outer surface of said connecting element (17) being complementary in shape to said inner surface.

\* \* \* \* \*